United States Patent [19]

Tanaka et al.

[11] Patent Number: 5,261,245

[45] Date of Patent: Nov. 16, 1993

[54] METHOD FOR MAKING ICE SLAB AND/OR ARTIFICIAL SNOW

[75] Inventors: Haruhiko Tanaka, Yokohama; Taiji Kambayashi, Yamatotakada; Yasumasa Sugiyama, Oizumimachi; Toshitake Nagai, Ojimamachi; Koiti Nagata, Ota; Kohei Kubota; Kazuo Hirano, both of Tokyo, all of Japan

[73] Assignees: Miura Dolphins Co., Ltd.; Tonen Corporation, both of Tokyo; Osaka Organic Chemical Industry Co., Ltd., Osaka; Tonen Chemical Corp., Tokyo; Sanyo Electric Co., Ltd., Moriguchi; Ohtsuka, Masahisa, Ohizumimachi, all of Japan

[21] Appl. No.: 843,383

[22] Filed: Feb. 28, 1992

[30] Foreign Application Priority Data

Mar. 1, 1991 [JP] Japan .................................. 3-61123

[51] Int. Cl.$^5$ ............................ F25C 1/00; F25D 3/00
[52] U.S. Cl. ........................................... 62/59; 62/66; 62/74; 62/75
[58] Field of Search ........................ 62/74, 59, 75, 66

[56] References Cited

U.S. PATENT DOCUMENTS

| 3,251,194 | 5/1966 | Walker | 62/66 |
| 3,751,935 | 8/1973 | MacCracken et al. | 62/75 |
| 4,742,958 | 5/1988 | Bucceri | 62/74 X |
| 4,793,142 | 12/1988 | Bucceri | 62/74 |
| 5,136,849 | 8/1992 | Miura et al. | 62/74 X |

FOREIGN PATENT DOCUMENTS

| 462314 | 1/1971 | Japan | 62/74 |
| 0101359 | 4/1990 | Japan | 62/74 |
| 0992959 | 2/1983 | U.S.S.R. | 62/74 |
| 8602936 | 2/1986 | World Int. Prop. O. | |
| 8903865 | 4/1989 | World Int. Prop. O. | |

Primary Examiner—Henry A. Bennet
Assistant Examiner—Christopher B. Kilner
Attorney, Agent, or Firm—Ostrolenk, Faber, Gerb & Soffen

[57] ABSTRACT

A method for easily making an ice slab serving as the foundation of an artificial snow skiing field and artificial snow whose upper layer is powdery by flooding aqueous slurry made by adding water to granular wet water absorbent polymer on a slope of a natural skiing field or a slant or horizontal surface of a natural skiing field or indoor artificial snow skiing field equipped with a cooling system, obtaining the deposit layer of the granular wet water absorbent polymer in which water is separated from the slurry and freezing the deposit layer.

20 Claims, 1 Drawing Sheet

METHOD FOR MAKING ICE SLAB AND/OR ARTIFICIAL SNOW

BACKGROUND OF THE INVENTION

1. Field of the Invention

The present invention relates to a method for making an ice slab or artificial snow.

2. Description of the prior art

One of the methods for making artificial snow in an artificial skiing field is a method for making artificial snow by freezing spray atomized water using compressed air (or other compressed gas) into an atmosphere having a temperature of the freezing point or lower. However, this method is not profitable because the equipment is expensive to install and a lot of compressed air is necessary.

The official gazette of Japanese Patent Publication No. 36635/1990 discloses a method for making artificial snow by aerating wet water absorbent polymer with added water at less than the water retention capacity of said water absorbent polymer, thereafter freezing it. For this method, however, the aerated granular wet water absorbent polymer is a gel. Therefore, to scatter the gel on the slope of the skiing field, it is necessary to transfer the gel by compressed air. It is also necessary to separately prepare an ice slab for protecting the pipes equipped on the floor for refrigeration where coolant circulates.

Moreover, to collect melted artificial snow and reuse it by cleaning it with water, it is necessary to adjust the amount of absorbed water after cleaning and dry the collected water absorbent polymer. Therefore, the method is not profitable because operation is complex.

The specification of U.S. Pat. No. 3,251,194 discloses a method for making a skating rink by freezing water absorbent polymer and water but it does not disclose a method for making artificial snow using specific water absorbent polymer and specified amount of water.

The present invention provides a method for making an ice slab for protecting a freezing system equipped on the foundation of the artificial snow field and/or powdery artificial snow for covering the ice slab by a simple system and operation.

Particularly, the present invention provides a method for making an ice slab and powdery artificial snow with a single operation by freezing the fluid aqueous slurry of granular wet water absorbent polymer which is laid up on a horizontal or sloped floor.

SUMMARY OF THE INVENTION

As the result of studying a method for simply making an ice slab used for foundation of the skiing field of artificial snow and powdery or hard artificial snow used for covering said ice slab, the inventors of the present invention completed this invention by finding that artificial snow in which a bottom layer is formed as an ice slab and in which an upper layer is formed as powdery snow can easily be made by freezing granular wet water absorbent polymer consisting of grains of wet water absorbent polymer, said water absorbent polymer means water absorbent polymer absorbed water or aqueous solution.

Moreover, the inventors find that, when the fluid aqueous slurry of granular wet water absorbent polymer made by adding water to said granular wet water absorbent polymer is flooded on the foundation of the artificial snow skiing field, water is easily separated from the aqueous slurry to form a piled up layer of the granular wet water absorbent polymer and powdery artificial snow can be obtained by freezing the piled up layer and also, artificial snow which bottom part is formed as an ice slab and which upper part is formed as powdery snow can easily be made by adjusting the amount of water remaining in the piled up layer and then freezing said piled up layer.

The present invention involves a method for making an ice slab and/or artificial snow, characterized by freezing granular wet water absorbent polymer wherein voids between grains of the polymer is not or in partly filled with water.

The present invention also involves shows a method for making an ice slab and/or artificial snow, characterized by separating water from the aqueous slurry of granular wet water absorbent polymer containing the amount of water or aqueous solution for filling all voids between grains of granular wet water absorbent polymer or more and freezing the granular wet water absorbent polymer having at least a part of voids between the grains of the polymer.

The present invention further involves shows a method in which water absorbent polymer comprises at least one of the polymer and copolymer selected from the group consisting of acrylamide, acrylic acid, salt of polyacrylic acid, vinyloxazolidine, salt of methacrylic acid, styrene, vinyl ether, and styrene sulfonate.

The present invention includes a method in which the granular wet water absorbent polymer is spherical-shaped or crushed-shaped wet water absorbent polymer.

The present invention can be a method in which the granular wet water absorbent polymer has non-tackiness between the granular grains.

The present invention method can be one in which the granular wet water absorbent polymer has an average grain diameter of 0.005 to 5 mm.

The present invention includes shows a method in which water is separated from the aqueous slurry of the granular wet water absorbent polymer naturally or by means of suction.

The present invention also includes a method in which water is separated from the aqueous slurry of the granular wet water absorbent polymer by contacting the aqueous slurry of the granular wet water absorbent polymer with a permeable material.

The present invention still further comprises a method wherein the permeable material comprises at least one selected from the group consisting of a textile, granular organic matter, porous metallic plate, and wire gauze.

The present invention also comprises a method wherein the granular wet water absorbent polymer is frozen by contacting it with a solid maintaining the temperature of the freezing point or below.

The present invention comprises shows a method wherein the solid maintaining the temperature of the freezing point or below comprises at least one selected from the group consisting of a plastic pipe, metallic pipe, plastic plate, metallic plate, ice, ice-contained material, and permeable material which are directly or indirectly cooled by a fluid having a temperature of the freezing point or below.

The present invention still further comprises a method wherein the solid maintaining the temperature of the freezing point or below is set in or under the granular wet water absorbent polymer.

The present invention includes a method wherein the surface of the granular wet water absorbent polymer contacts a gas having a temperature of −5° C. or higher.

The present invention further includes shows a method wherein the granular wet water absorbent polymer with its surface contacted with the gas having a temperature of −5° C. or higher is frozen by contacting it with the solid maintaining the temperature of the freezing point, and, when at least part of the granular wet water absorbent polymer is frozen, the surface of the granular wet water absorbent polymer under the above condition or the condition in which unfrozen part of the polymer is mixed with the frozen part of it is frozen by contacting it with the gas having a temperature of the freezing point or below.

The present invention also includes a method wherein the surface of granular wet water absorbent polymer is frozen by contacting it with the gas having a temperature of the freezing point or below.

The present invention comprises a method wherein the granular wet water absorbent polymer is frozen by contacting it with solid carbon dioxide, liquid carbon dioxide, and/or liquid nitrogen.

The present invention also comprises a method wherein part or the whole of the frozen granular wet water absorbent polymer is crushed.

The present invention further comprises a method wherein the crushed frozen granular wet water absorbent polymer is scattered.

The present invention includes a method wherein the granular wet water absorbent polymer is a wet water absorbent polymer which is contacted with at least one selected from the group consisting of alkali metal salt or alkaline earth metal salt.

The present invention still further includes a method wherein the granular wet water absorbent polymer is a wet water absorbent polymer which is contacted with at least one of surface active agent.

Definition of the terms used for the present invention and their measuring method is described below in order to describe the present invention in detail. Definition of the terms and their measuring method is described as an aid for understanding the contents of the present invention. However, the contents of the present invention are not limited by the definition of the terms and their measuring method. Therefore, it is possible to use other measuring method unless it deviates from the gist of the present invention.

BRIEF DESCRIPTION OF THE PHOTOGRAPHS

Photograph No. 1 is a microscopic photograph showing a crystalline structure of artificial snow of the present invention. The unit of scale shown in it is 1 mm.

Photograph No. 2 is a microscopic photograph showing a condition wherein the crystalline structure of the artificial snow is melted. The unit of scale shown in it is the same as the photograph No. 1.

DETAILED DESCRIPTION OF THE INVENTION

A. Definition

Figure 1:
Figure 2:
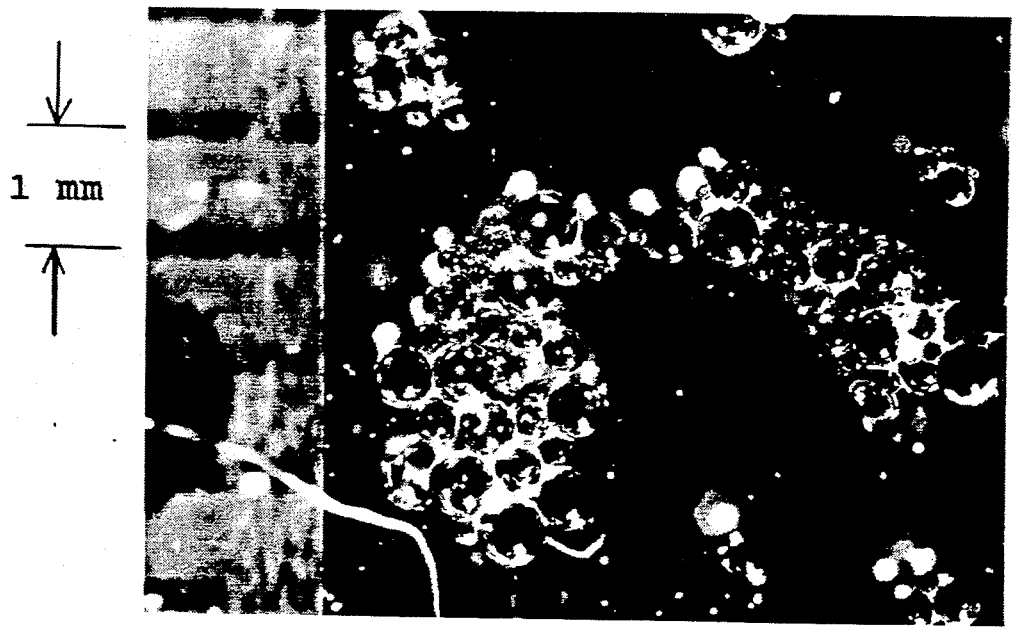

Ice slab: Defined as flat ice or ice-containing material which is mainly equipped on the foundation of an artificial snow field and used to reinforce the foundation and/or protect the cooling pipes laid on the foundation.

Artificial snow: Defined as powdery ice, ice-contained material, or solid consisting of combined grains of powdery ice or ice-like material, which are unnecessary to have a crystalline structure like natural snow.

Water absorbent polymer: Defined as macromolecular compound being capable of absorbing water or aqueous solution essentially before absorbing water or aqueous solution. Synthetic-resin-based macromolecular compounds such as polymer, copolymer, and terpolymer of acrylamide, acrylic acid, salt of acrylic acid, salt of methacrylic acid, styrene, and vinyl ether are listed as the water absorbent polymer used for the present invention. To form these water absorbent polymers into a granular water absorbent polymer before absorbing water which is one mode used for the present invention, there are a method to crush these macromolecular compounds and form them into the predetermined size and shape of grains and a method to form material compounds of macromolecular compounds into granular macromolecular compounds by polymerizing or condensing them. Particularly, a preferable method is to saponify the spherical polyacrylate obtained through reversed phase suspension polymerization, copolymer of vinyl alcohol and acrylate, or copolymer of isobutylene and maleic anhydride.

Wet water absorbent polymer: Defined as water absorbent polymer after absorbing water or aqueous solution.

Granular wet water absorbent polymer: Defined as an aggregate of the wet water absorbent polymer whose shape is granular. Individual grain is expressed as the grain of the granular wet water absorbent polymer. In this case, the term "granular" represents the condition in which a void is produced between grains when each grain has a shape and the grains are aggregated. That is, granular wet water absorbent polymer is defined as the aggregate of grains of the wet water absorbent polymer each in which grain has a shape and a void is produced between grains and there is no water between grains though a small amount of water is present on the surface of each grain.

The granular wet water absorbent polymer used for the present invention includes the granular wet water absorbent polymer made by adding water to the above granular water absorbent polymer, the granular wet water absorbent polymer made by adding water to non-granular water absorbent polymer or the granular water absorbent polymer consisting of large grains and crushing it, and the granular wet water absorbent polymer which already absorbs water in the grain state when water absorbent polymer is manufactured.

Aqueous slurry of the granular wet water absorbent polymer: Defined as water or aqueous solution in which the granular wet water absorbent polymer is suspended. The aqueous slurry includes the following two types: one consisting of the granular water absorbent polymer and filler water (hereinafter defined) and the other consisting of the granular wet water absorbent polymer, filler water, and free water (hereinafter defined).

Water absorption: Defined as weight increase of the weight of water or aqueous solution absorbed in the water absorbent polymer compared to the weight of the water absorbent polymer before absorbing water or aqueous solution, which is measured by the method to be mentioned later.

Water for absorption: Defined as water or aqueous solution to be absorbed by the water absorbent polymer.

Filler water: Defined as water or aqueous solution present in the void between grains of the granular wet water absorbent polymer.

Void index: Defined as the increase of the weight of water or aqueous solution filling all voids between grains of the granular wet water absorbent polymer compared to the weight of the water absorbent polymer contained in the granular wet water absorbent polymer, which is measured by the method to be mentioned later.

Free water: Defined as extra water or aqueous solution further added to the mixture of the granular wet water absorbent polymer containing the amount of water or aqueous solution equivalent to the void index.

Non-tackiness: Defined as a condition in which grains of the granular wet water absorbent polymer have a high flowability because the interaction of them is small. Non-tackiness degree is not determined by a simple factor because it depends on the integrated result of various actions produced between grains such as grain shape, surface condition of grains, degree of bond strength between grains, and static or dynamic frictional resistance between grains. Therefore, in the present invention, the non-tackiness degree is described by using a quantitative expression indicating the easiness of movement between grains. For convenience sake, however, the non-tackiness degree is expressed as the ratio of the volume of a certain amount of the granular wet water absorbent polymer when it is adequately agitated to increase void between grains and swell the grains before flowing the grains by vibration to return them to the condition before swelled to the original volume of the granular wet water absorbent polymer. Thus, it is assumed that the non-tackiness degree increases as the above former volume comes closer to the latter original volume. That is, it is assumed that, when grains are adequately agitated and swelled and then agitation is stopped, the grain returning to the condition before being agitated has completely non-tackiness. Measurement is executed by the method to be mentioned later. However, the non-tackiness degree is not necessarily limited to the result of the measurement by this method.

Permeability of the granular wet water absorbent polymer: Defined as the degree of resistance of water or aqueous solution flowing through the void between grains of the granular wet water absorbent polymer, which is measured by the method to be mentioned later for convenience sake.

Drainage rate: Defined as degree of difficulty for separation of filler water from aqueous slurry of the granular wet water absorbent polymer, which is measured by the method to be mentioned later for convenience sake and shown by the ratio of the amount of the filler water separated after 24 hours to the void index.

B. Measuring Method

1. Preparation for Aqueous Slurry of Granular Wet Water Absorbent Polymer

1-1. To Make Granular Water Absorbent Polymer Absorb Water

For the water absorbent polymer which is granular before absorbing water, the aqueous solution of the granular wet water absorbent polymer is prepared according to the method below.

The necessary amount of the granular water absorbent polymer (A) [which is determined so that the volume of the granular wet water absorbent polymer ranges between 90 and 100 ml, the necessary amount of the granular water absorbent polymer is 1 g when the water absorption ranges between 90 and 100 times] is suspended in 200 g of water or aqueous solution and left as it is for 24 hours to obtain the aqueous slurry of the granular wet water absorbent polymer.

1-2. For Aqueous Slurry of Granular Wet Water Absorbent Polymer

The aqueous slurry of the granular wet water absorbent polymer is prepared according to the procedure below to obtain the granular wet water absorbent polymer by adding water to a mass of the water absorbent polymer and crushing it or by crushing the water absorbent polymer already absorbing water, or to directly obtain the aqueous slurry of the granular wet water absorbent polymer.

The granular wet water absorbent polymer is obtained by separating water from the aqueous solution containing the granular wet water absorbent polymer through suction filtration. Then, the specimen of 90 to 100 ml is sampled from the thus obtained granular wet water absorbent polymer and the weight (A') of the specimen is measured and suspended in 200 g of water or aqueous solution and left as it is for 4 hours before obtaining the aqueous slurry of the granular wet water absorbent polymer.

Moreover, a certain amount (T) of the granular wet water absorbent polymer is dried through freeze-drying or hot-air drying before measuring the weight (U) of the water absorbent polymer.

*Weight (A) of water absorbent polymer in granular wet water absorbent polymer* $= A' \times (U/T)$

2. Measurement of Water Absorption and Void Index

Then, the slurry is put in a 200 ml measuring cylinder with the length of 25 cm or more, the volume of approx. 250 ml, and the known weight (M) having a filter medium and a drain pipe with a cock for separating water through the filter medium at the bottom of the cylinder. (The measuring cylinder is effective to measure the permeability of the granular wet water absorbent polymer because the height of 1 mm is equivalent to the volume of 1 ml when the pipe diameter is 35.7 mm.)

Free water is drained from the drain pipe. When the grains of the granular wet water absorbent polymer in the slurry appears on the water surface, drainage is stopped to measure the weight (B) of the entire measuring cylinder (measuring cylinder, granular wet water absorbent polymer, and filler water) and the volume (b) of the granular wet water absorbent polymer and filler water. It is necessary to strongly secure the filter medium at the bottom of the measuring cylinder so that it will not separate from the bottom for measurement of non-tackiness.

Then, the drain pipe is connected to a pressure reducing device to drain filler water from the grains through suction.

When drainage of the filler water is completed, the weight (C) of the entire measuring cylinder (measuring cylinder and granular wet water absorbent polymer) and the volume (c') of the granular wet water absorbent polymer are measured. After measurement is completed, the granular wet water absorbent polymer is left for 24 hours. Then, the volume (c) of the granular wet water absorbent polymer and the height (H) of it from the bottom of the measuring cylinder are measured to enter the top position of the granular wet water absorbent polymer on the surface of the measuring cylinder. (Because the volume of granular wet water absorbent polymer decreases depending on the type of granular water absorbent polymer, the volume is measured after 24 hours so as to wait for the decreased volume to recover.)

$$Void\ index = (B - C)/A$$

$$Water\ absorption = (C - M)/A$$

3. Measurement of Non-Tackiness

After the water absorption is measured, the granular wet water absorbent polymer with the volume (c) is adequately agitated and grains are scattered by closing the opening at the top of the measuring cylinder and repeatedly turning the cylinder upside down.

After grains are adequately scattered by agitating the granular wet water absorbent polymer, the measuring cylinder is set to a vibrator and vertically vibrated to stabilize the grains of the granular wet water absorbent polymer. When the granular wet water absorbent polymer is adequately stabilized, the volume (d) of it is measured.

$$Non\text{-}tackiness = d/c$$

4. Measurement of Drainage Rate

Water or aqueous solution is added to the granular wet water absorbent polymer in the measuring cylinder whose non-tackiness is already measured and the granular wet water absorbent polymer is agitated again to prepare approx. 200 ml of the aqueous slurry of the granular wet water absorbent polymer.

Then, a rubber tube is connected to the drain pipe at the bottom of the measuring cylinder and the cylinder is put in a water bath filled with water whose surface is 25 cm high from the bottom of the cylinder in order to produce the pressure difference of 25 cm in water column from the bottom of the cylinder.

Then, the drain cock of the measuring cylinder is opened to start draining of water. When the grains of the granular wet water absorbent polymer appears on the water surface of the aqueous slurry of the granular wet water absorbent polymer, the cock of the cylinder is closed to measure the weight (D) of the entire measuring cylinder (measuring cylinder, granular wet water absorbent polymer, and filler water in all voids). Then, the cock of the drain pipe is opened to start draining. After 24 hours, the weight (E) of the entire measuring cylinder (measuring cylinder, granular wet water absorbent polymer, and remaining filler water) is measured.

Then, the drain pipe is connected to the pressure reducing device and the filler water is removed by the granular wet water absorbent polymer according to the method for measuring water absorption to measure the weight (F) of the entire measuring cylinder (measuring cylinder and granular wet water absorbent polymer).

$$Drainage\ rate = (D - E)/(D - F)$$

5. Measurement of Permeability of Granular Wet Water Absorbent Polymer

After measurement of drainage characteristic, aqueous slurry is prepared by adding 100 g of water to the granular wet water absorbent polymer. Then, when the grains appear on the surface of the slurry of the granular wet water absorbent polymer after draining water from the bottom of the measuring cylinder according to the same procedure as that for measurement of drainage characteristic, the distance (H) between the surface of the slurry and the bottom of the measuring cylinder is measured and a filter paper is put on the granular wet water absorbent polymer. Then, water is slowly added to the polymer through the filter paper so that the water level is 25 cm from the bottom of the measuring cylinder. Then, a rubber tube is connected to the drain pipe at the bottom of the cylinder to put the cylinder in a water bath whose water level is 25 cm below the bottom of the cylinder so that a pressure difference equivalent to 25 cm in water column from the bottom of the cylinder is produced. Therefore, the pressure difference between the surface of the slurry and the water surface of the bath is 50 cm in water column.

Then, water is drained by opening the drain cock of the measuring cylinder to measure the time (t) in which the distance between the water surface and the bottom of the cylinder decreases from 25 to 15 cm.

After measurement, the granular wet water absorbent polymer is eliminated from the measuring cylinder to measure the time (t') in which the water level decreases from 25 to 15 cm by using water instead of slurry and opening the cock of the drain pipe.

$$Permeability\ of\ granular\ wet\ water\ absorbent\ polymer = (t - t')/H$$

The first feature of the present invention lies in the fact that powdery artificial snow can easily be made by freezing granular wet water absorbent polymer. The granular wet water absorbent polymer used for the present invention, as described in the section of terminology, is the aggregate of grains of the wet water absorbent polymer in which each grain keeps a shape, a void is present between grains, and no water is present in voids between grains though a small amount of water is present on the surface of each grain.

That is, the granular wet water absorbent polymer of the present invention is granular water absorbent polymer after absorbing water and the making method and process are not restricted. For example, the granular wet water absorbent polymer of the present invention includes granular wet water absorbent polymer obtained by adding water to a mass of water absorbent polymer to make the water absorbent polymer absorb water and then crushing it, granular wet water absorbent polymer consisting of small grains obtained by crushing granular wet water absorbent polymer consisting of large grains, granular wet water absorbent polymer which already absorbed water in the water absorbent polymer making process, and granular wet water absorbent polymer obtained by cleaning granular wet water absorbent polymer collected from an artificial snow field with water to eliminate foreign matters and separating water from the aqueous slurry including the granular wet water absorbent polymer.

Particularly, the preferable granular wet water absorbent polymer of the present invention is the wet water absorbent polymer obtained by separating water from the aqueous slurry of the granular wet water absorbent polymer obtained by adding water or aqueous solution to the granular water absorbent polymer to make the granular water absorbent polymer absorb water or aqueous solution.

Though the grain shape is not limited, spherical-shaped or crushed-shaped grain is preferable. Particularly, the spherical-shaped grain is preferable because it provides powdery artificial snow. The crushed-shaped grain also provides powdery artificial snow if it has non-tackiness and has a small frictional resistance between grains. The spherical-shaped grain is desirable because it provides powdery artificial snow because it smoothly moves between grains even if the surface of the grain has slight tackiness. Spherical non-tackiness granular wet water absorbent polymer is the most suitable granular wet water absorbent polymer meeting such conditions very easily becomes powdery artificial snow by freezing it.

Granular wet water absorbent polymer with the grain diameter of approx. 0.005 to 5 mm, particularly, 0.05 to 2 mm is preferable for the granular water absorbent polymer used for the present invention. Granular wet water absorbent polymer consisting of smaller grains is desirable because powdery artificial snow can more easily be obtained. However, granular wet water absorbent polymer consisting of too small grains is not desirable because it takes long time to separate water from the mixture of the granular wet water absorbent polymer and water and the remaining filler water increases.

For granular wet water absorbent polymer consisting of large grains, water is easily separated from the mixture of the granular wet water absorbent polymer and water but artificial snow made by freezing the granular wet water absorbent polymer becomes granular or ice-slab like. Therefore, this granular wet water absorbent polymer is preferable for making an ice slab but it is not preferable for making powdery artificial snow. To make an ice slab and powdery artificial snow, it is desirable to use granular water absorbent polymer with the grain diameter of 0.5 to 2 mm.

Granular wet water absorbent polymer with higher water absorption is preferable as long as the granular wet water absorbent polymer has a large strength and non-tackiness. In general, however, when the water absorption increases, the gel strength of granular wet water absorbent polymer decreases, voids between grains decrease, and tackiness between grains increases. Therefore, the preferable water absorption is 10 to 500 times, particularly, 30 to 200 times for water or aqueous solution.

Spherical water absorbent polymer is preferable because the void between grains of granular wet water absorbent polymer increases, water is easily separated, and frictional resistance between grains decreases, and artificial snow obtained by freezing the granular wet water absorbent polymer easily becomes powdery.

To keep the granular wet water absorbent polymer used for the present invention spherical and non-tackiness after it absorbs water, it is necessary to increase the degree of crosslinking of the granular wet water absorbent polymer by polyepoxy or polyamine. However, water absorption decreases from excessive crosslinking. Therefore, it is necessary to control the amount of cross linking agent so that a proper water absorption is obtained. To easily control the water absorption of granular wet water absorbent polymer, there is a method to contact the water or aqueous solution to be absorbed in the granular wet water absorbent polymer with a small amount of alkali metal salt or alkaline earth metal salt such as sodium chloride or calcium chloride.

As the contacting method, it is possible to use to add the salt to the water or aqueous solution used for absorption or a method to add the salt containing solution to the granular wet water absorbent polymer or after that separating the salt containing water.

The effect of the present invention appears because it is characterized by using granular water absorbent polymer which is still granular even after absorbing water and has a strength capable of forming void between grains which are non-tackiness and easily move.

Therefore, tackiness granular wet water absorbent polymer and/or granular wet water absorbent polymer which cannot hold grains because of an insufficient strength or produce void between grains will not show the effect of the present invention.

Any method can be used to make water absorbent polymer absorb water. For example, it is enough to put the water absorbent polymer in agitated water and leave it for several minutes.

The water absorbing rate of the water absorbent polymer depends on the water temperature. Therefore, it decreases as the water temperature decreases and increases as the water temperature increases. For a water temperature of 10° C. or lower, for example, it is possible to properly heat the water absorbent polymer before making it absorb water. However, to efficiently freeze the wet water absorbent polymer, it is desirable to make the wet water absorbent polymer absorb water at a low temperature.

Granular wet water absorbent polymer can stably be kept without discharging water even if it is left as it is at room temperature. Therefore, the granular wet water absorbent polymer is not affected even if it is left as it is for a while (e.g. two months or more) until it is frozen to produce artificial snow.

Because granular wet water absorbent polymer has a hygroscopic property, it is desirable to store the granular wet water absorbent polymer in a closed container so that it is not moisten.

The second feature of the present invention lies in the fact that the bottom part of granular wet water absorbent polymer consisting of granular water absorbent polymer already absorbing water or aqueous solution forms an ice slab and the upper part of it forms artificial snow by freezing it under the condition wherein void between grains of the polymer is partly filled with water.

That is, the second feature is that artificial snow optionally setting the ratio between ice slab and powdery artificial snow can easily be obtained by adjusting the amount of filler water present in the void between grains of the granular wet water absorbent polymer.

The third feature of the present invention is a method for making an ice slab and/or artificial snow obtained by separating water from the aqueous slurry of the granular wet water absorbent polymer containing the amount of water or aqueous solution for filling all the void between grains of the granular wet water absorbent polymer consisting of granular water absorbent polymer already absorbing water or aqueous solution and freezing the granular wet water absorbent polymer brought under the condition in which at least a part of the void between grains has been produced.

That is, the third feature is that the aqueous slurry of the granular wet water absorbent polymer made by adding water to the granular wet water absorbent polymer is fluid slurry which can easily be transferred by a pump.

Moreover, the third feature is that, because the void between grains of the granular wet water absorbent polymer have high permeability, water is very easily separated from the slurry of the granular wet water absorbent polymer and a deposit layer of the granular wet water absorbent polymer is obtained by flooding the aqueous slurry of the granular wet water absorbent polymer onto slanted and horizontal surfaces. Therefore, when flooding the aqueous slurry made by adding water to the granular wet water absorbent polymer used for the present invention onto slanted and horizontal surfaces of a natural skiing field, natural skiing field provided with a cooling system, or indoor artificial skiing field, water is separated from the slurry and a deposit layer of the granular wet water absorbent polymer is formed. When more time elapses, filler water between grains of the granular wet water absorbent polymer is also separated and a void is formed between the grains.

Therefore, the amount of water present between grains in the deposit layer being before frozen can be adjusted by controlling the time from flooding and laying of the granular wet water absorbent polymer to the start of freezing it and thereby, the ratio between ice slab and artificial snow after freezing can freely be adjusted. In addition, it is possible to control the amount of water to be kept between grains by mixing granular water absorbent polymers with different grain sizes even if the time from flooding and laying of the polymer to the start of freezing it is the same. Moreover, it is possible to control the amount of water to be kept between grains by contacting the granular wet water absorbent polymers with a surface active agent. To contact the granular wet water absorbent polymers with the surface active agent, there are methods to add the surface active agent to the water or aqueous solution to be absorbed and to add the surface active agent to the granular wet water absorbent polymers.

It is possible to use any one of the anionic, nonionic, an cationic surface active agents. However, it is preferable to use a nonionic surface active agent which hardly influences granular wet water absorbent polymer. Particularly, an anionic surface active agent has an influence as a salt, which can also be used for adjustment of water absorption depending on the type of granular wet water absorbent polymer.

The present invention can use a method for making an ice slab and artificial snow by laying up granular wet water absorbent polymer or granular water absorbent polymer containing filler water on an artificial snow slope before freezing it and a method for separately freezing granular wet water absorbent polymer or granular wet water absorbent polymer containing filler water (and free water) and crushing the frozen granular wet water absorbent polymer to scatter or lay up on an artificial snow field when necessary.

The most preferable mode of the present invention is a method for making an ice slab and artificial snow by transferring the aqueous slurry made by adding the filler water and the free water to granular wet water absorbent polymer to a skiing field by a pump to form a deposit layer and freezing the deposit layer of the granular wet water absorbent polymer obtained by eliminating the free water and filler water separated from the deposit layer.

Excessive free water for preparing the slurry of the granular wet water absorbent polymer used for the present invention is not preferable because the viscosity of the obtained slurry becomes too low and thus, the deposit layer of the granular wet water absorbent polymer flooded on an artificial snow skiing field becomes too thin. However, insufficient free water would produce granular slurry, impairing operability. Therefore, it is necessary to properly select the suitable amount of water or aqueous solution to be mixed by considering the above points. The desirable amount of free water is 1 to 50% of the sum of absorption water and filler water, more preferably, 5 to 10% of it.

When an surface active agent is added to the water to be added to water absorbent polymer, water is easily separated from granular wet water absorbent polymer, the frictional resistance between grains decreases, non-tackiness is improved, and artificial snow becomes powdery. Therefore, it is effective to use the surface active agent.

To lay up the granular wet water absorbent polymer on an artificial snow skiing field, the following methods are the most convenient and effective a method to pile up the granular wet water absorbent polymer from the bottom to the top of a slope by a pump to lay up it on the slope, a method to lay up the granular wet water absorbent polymer by flooding it from the top of the slope, and a method to scatter the grains of the granular wet water absorbent polymer on the slope by a sprayer having holes which the grains can pass through. However, if the granular wet water absorbent polymer contains no water or small amount of water, high-viscosity, granular, or clay-like slurry is obtained. In this case, a special pump or conveyer should be used. Therefore, these methods are not preferable as the depositing method when constructing a new field. However, they are preferable to lay up the granular wet water absorbent polymer on an existing artificial snow field because excessive drain (the free water and the filler water) to be separated does not affect the existing artificial snow.

It is possible to directly separate the free water and the filler water from the granular wet water absorbent polymer laid up on the foundation of an artificial snow skiing field or on natural or artificial snow. However, it is desirable to equalize the thickness of the laid up granular wet water absorbent polymer by using a rake or doctor-blade-type tool. It is a more preferable method to form grooves in the longitudinal and transverse directions or like grid when or after equalizing the thickness of the granular wet water absorbent polymer. These grooves have the effects that water is easily separated and frozen artificial snow becomes powdery.

To separate water from the slurry of granular wet water absorbent polymer, it is a preferable method to drain water naturally or by means of suction from the bottom of side of the foundation of an artificial snow field through a permeable material such as wire gauze, paper, woven fabric, or non-woven fabric. However, it is possible to use another method, for example, a method to absorb water by a permeable material set at the bottom of the granular wet water absorbent polymer according to necessity.

When flooding or spraying the slurry of granular wet water absorbent polymer on an artificial snow skiing field, the entire free water and most filler water contained in the granular wet water absorbent polymer pass through the void at the bottom of and inside the granular wet water absorbent polymer and are drained through a drainage system equipped on the foundation of the artificial snow slope, and the granular wet water absorbent polymer remains to form its deposit layer. Even if no drainage system is set to the artificial slope, free water and filler water pass through the void between the grains of granular wet water absorbent polymer and are collected at the granular wet water absorbent polymer layer at the bottom part of the slope, and the deposit layer of the granular wet water absorbent polymer is formed on the slope. Therefore, it is enough to only set a drainage system at the bottom part of the slope.

The thickness of the deposit layer increases when the viscosity of the slurry of granular wet water absorbent polymer increases, the speed of the water drained from the artificial snow field increases, and the grain of the granular wet water absorbent polymer is spherical and large.

To drain water, no drainage system is necessary for a permeable foundation like when flooding granular wet water absorbent polymer on a slope of natural soil because water is absorbed in the soil. For the foundation made of a non-permeable material like the foundation of an artificial snow slope, however, it is a preferable method to drain water from the holes formed at the bottom or side of the slope through a permeable material.

Moreover, it is possible to use a method to flood the slurry of granular wet water absorbent polymer on a porous metallic plate, wire gauze, powder or grains of an organic or inorganic material, paper, textile product such as woven or non-woven fabric, or permeable material made of granular wet water absorbent polymer not or already absorbing water with the same or different grain size provided on the surface of the foundation of an artificial snow skiing field, and transfer the filler water into the permeable material or make the material absorb the filler water; a method to drain water to the outside of the slope through the permeable material; and a method to form grooves or holes at places on the slope and drain water through the grooves or holes or collect water in the grooves or holes to drain the water directly or from the grooves or holes. However, the method of the present invention is not restricted to the above methods.

To freeze granular wet water absorbent polymer in the present invention, it is possible to use a method to contact the granular wet water absorbent polymer with a solid maintaining the temperature of the freezing point or below, a method to contact the polymer with a gas having a temperature of the freezing point or below, and a method to mix the polymer with a sublimating solid such as solid carbon dioxide or a liquid with a low boiling point such as liquid carbon dioxide or liquid nitrogen. Particularly, a method to freeze granular wet water absorbent polymer by contacting it with a solid set at and/or near the bottom of the granular wet water absorbent polymer and directly or indirectly cooled by a fluid having a temperature of the freezing point or below is preferable because powdery artificial snow can be made.

To contact granular wet water absorbent polymer with a solid maintaining the temperature of the freezing point or below, there are methods to set a pipe directly or indirectly cooled by a coolant such as a fluid having a temperature of the freezing point or below at the bottom of or inside the polymer and to freeze the polymer by setting a metallic plate directly or indirectly cooled by the above coolant under the polymer, or through ice alone or an ice slab consisting of ice and an organic or inorganic material. It is permitted that at least part of the solid maintaining a temperature of the freezing point or below is made of a permeable material.

It is the most desirable method for freezing granular wet water absorbent polymer to freeze the granular wet water absorbent polymer by a plate directly or indirectly cooled by a fluid having a temperature of the freezing point or below set at the bottom part of the deposit layer of the polymer and/or a pipe directly or indirectly cooled by a fluid having a temperature of the freezing point or below set at or near the bottom part of the deposit layer from the bottom of the deposit layer.

Though the detailed mechanism in which powdery artificial snow can easily be obtained by the present invention is unknown, the surface of the granular wet water absorbent polymer of the present invention is covered with a small amount of water and, when freezing starts, the water is first frozen and granular or small-projection-like ice is produced. Then, ice grows by using the produced granular or small-projection-like ice as a core to form projection-like ice and the apparent grain diameter increases by the value equivalent to the outside diameter of the projection.

Because the grains of the granular wet water absorbent polymer of the present invention keep an independent shape and they easily move, another grain contacting a frozen grain is pushed by the projection on the surface of the frozen grain and moved outside by the length of the projection. Thus, the void between the grains increases. This action progresses from the bottom to the top layer. Thus, it is estimated that the aggregate of high bulky ice grains (artificial snow of the present invention) is obtained. This phenomenon is estimated because the aggregate of high bulky ice grains has the grain of the water absorbent polymer with a diameter smaller than that before the grain is frozen at the center of it and ice grains present around it, especially in case of the grain of the wet water absorbent polymer having a smaller diameter (e.g. that the diameter is a range from 0.1 to 1 mm after absorbing water or aqueous solution), the aggregate is mixture of grains of the water absorbent polymer having a diameter before absorbing water or aqueous solution wherein ice grains are existing around said grains and ice grains having no water absorbent polymer by observing the above high bulky ice grain (artificial snow of the present invention). Further, we suppose that the ice is made of water which is absorbed by the water absorbent polymer and the water absorbent polymer is not frozen. Accordingly, the wet water absorbent polymer functions like as carrier of water.

When rapidly freezing a single grain taken out of the deposit layer, the grain does not have the above structure but it becomes uniform ice. For the aggregate of a few grains, the grains are strongly bonded by ice.

When the deposit layer of granular wet water absorbent polymer is rapidly frozen, the bottom layer is frozen and bulky artificial snow is produced. However, the thermal conductivity decreases and, resultingly, rapid freezing does not progress. Therefore, it is estimated that the above bulky artificial snow is obtained.

For the present invention, freezing of granular wet water absorbent polymer without applying pressure from the top layer is one of the conditions necessary to make powdery artificial snow.

Therefore, when freezing the surface of the deposit layer of granular wet water absorbent polymer by putting a slab or plate directly on the surface, the frozen artificial snow becomes harder for upper layer due to the pressure of the object put on the surface though the bottom is powdery, and the surface may become plate ice according to circumstances. To obtain hard artificial snow, however, the above method is effective because the hard artificial snow is obtained by crushing and agitating the surface.

Therefore, to obtain powdery artificial snow, it is desirable to use a method to freeze granular wet water absorbent polymer by contacting the surface of it with a gas having a temperature of −5° C. or higher, more preferably, a gas having a temperature of the freezing point or higher.

For the present invention, it takes time to produce powdery artificial snow because the thermal conductivity of the artificial snow decreases as freezing progresses. Therefore, it is a desirable method to freeze the surface of granular wet water absorbent polymer by contacting the surface of it with a gas of the freezing point or lower when most grains of the polymer are frozen because artificial snow with an excellent slipping characteristic can be obtained. It is an economical desirable method to agitate and mix frozen artificial snow and unfrozen granular wet water absorbent polymer during freezing and continue freezing again or complete freezing by contacting the surface of the granular wet water absorbent polymer with a gas having a temperature of the freezing point or below. The desirable temperature of the solid maintaining a temperature of the freezing point or below is −5° C. or below, and the particularly desirable temperature is −15° C. or below. For granular wet water absorbent polymer consisting of large grains or slightly tackiness grains, however, high a temperature (e.g. −3 to −10° C.) is preferable.

Moreover, thicker deposit layer is desirable because artificial snow becomes more powdery. However, it takes time to complete freezing. Therefore, it is desirable to use a means for improving the thermal conductivity of artificial snow by agitating frozen artificial snow and unfrozen granular wet water absorbent polymer during freezing as mentioned above. The preferable thickness of the deposit layer is 2 to 20 cm, and more preferably, 5 to 10 cm.

To contact granular wet water absorbent polymer with a gas having a temperature of the freezing point or below, there is a method to flow a gas having a temperature of the freezing temperature or lower on the deposit layer of the granular wet water absorbent polymer. In this case, it is possible to cover the surface of the deposit layer of the granular wet water absorbent polymer with a heat insulating slab.

To mix granular wet water absorbent polymer with a sublimating solid such as carbon dioxide, liquid carbon dioxide, or liquid nitrogen, or liquid with a low boiling point, there are methods to scatter the powdered solid carbon dioxide on the surface of the granular wet water absorbent polymer and to mix part or the whole of the deposit layer of the granular wet water absorbent polymer with solid carbon dioxide, liquid carbon dioxide, or liquid nitrogen. In this case, it is also possible to use a method to mix them on an artificial snow slope and, at the same time, contact the granular wet water absorbent polymer with a solid maintaining the temperature at the freezing point or below at the inside or bottom of the polymer together with any of the above methods.

Commercial liquid carbon dioxide can be used. The latent heat of vaporization of liquid carbon dioxide is 15.1 Kcal/kg at 30° C., 48.1 Kcal/kg at 10° C., and 56.1 Kcal/kg at 0° C. Therefore, liquid carbon dioxide can effectively be used for cooling and freezing.

Liquid carbon dioxide is manufactured by compressing and cooling carbon dioxide under approx. 40 atm. The carbon dioxide producing source can use natural gas, off-gas produced by an ammonium plant, off-gas produced as the result of petroleum refining or ethylene decomposition, and extra or surplus gas produced by chemical and steel makers.

It is also possible to freeze granular wet water absorbent polymer by putting the deposit layer of the polymer of forming the deposit layer of the polymer in a mixing bath before mixing it with solid carbon dioxide, liquid carbon dioxide, or liquid nitrogen, or to freeze the polymer in a mixing bath equipped with a cooling system.

The artificial snow made by the above method can be scattered or laid up on the foundation of an artificial snow skiing field or a skiing field where natural snow or artificial snow is already laid up. As a scattering method, scattering artificial snow from the ceiling onto the field is particularly preferable for an indoor artificial snow skiing field because an effective atmosphere as if it snows is shown. Therefore, scattering or laying up artificial snow on the existing skiing field is effective as a method to maintain an artificial snow skiing field or reuse the used granular wet water absorbent polymer by cleaning it with water to eliminate foreign matter before freezing it again as artificial snow.

As the method to obtain the granular wet water absorbent polymer before frozen or granular wet water absorbent polymer containing filler water used for the present invention, it is an simple and effective method to separate water from the slurry of the granular wet water absorbent polymer as the above mentioned method. However, the method is not limited to the above one. It is also possible to use the following: (1) Method to mix granular wet water absorbent polymer with the amount of water or aqueous solution equivalent to the water for absorption equal to the water absorption and the necessary filler water; (2) Method to adjust the amount of filler water in the granular wet water absorbent polymer to be frozen to the predetermined value by flowing the slurry of the granular wet water absorbent polymer made by mixing the amount of water or aqueous solution equivalent to the water for absorption equal to the water absorption and necessary filler water with the amount of water equivalent to the water or aqueous solution to be absorbed by a permeable material equipped on an artificial snow slope on the permeable material and leaving the slurry as it is before transferring free water and unnecessary filler water to the permeable material.

Because the granular wet water absorbent polymer of the present invention has optically-degrading and bio-degrading characteristics, there is no problem to discard the polymer after using it. However, to accelerate optical degradation and bio-degradation, it is possible to blend, add, impregnate, or coat a known accelerator, catalyst, or addition agent for optical degradation and bio-degradation to or with the granular wet water absorbent polymer of the present invention.

Because the granular wet water absorbent polymer of the present invention is safe for human bodies, it is preferable to select the agent by considering safety.

It is also possible to color the granular wet water absorbent polymer of the present invention by a known method using a pigment or dye. Because the artificial snow made of colored granular wet water absorbent polymer is colorful, it is possible to add a new commercial value to it. For example, it is possible to classify the beginners' field and experts' field by colors. This makes skiing more enjoyable.

When giving fragrance to the granular wet water absorbent polymer of the present invention by using a perfume or aromatic, another new commercial value can be added to the polymer.

It is free to add, blend, coat, or impregnate an antioxidant, ultraviolet light absorber, fluorescent agent, nucleating agent, ice core forming bacteria, extender, substance having low friction factor, or other additive to or with the granular wet water absorbent polymer of the present invention.

DESCRIPTION OF THE PREFERRED EMBODIMENT

The following is the description of the present invention according to embodiments. However, the present invention is not restricted to the embodiments.

The density of the frozen artificial snow in the following embodiments and comparison examples is obtained according to the following operation.

A sample of frozen artificial snow whose density and volume are already known is weighed and the weight of the sample is divided by the volume to obtain the density whose unit is g/cm$^3$. When the artificial snow is soft, a sample of the artificial snow whose volume is already known can be obtained by inserting a thin stainless-steel case whose internal volume is already known into the artificial snow. When the artificial snow is hard, it is cut into a cube by a saw and the dimensions of it are measured by a ruler to calculate the volume.

EXAMPLE OF SYNTHESIZING GRANULAR WATER ABSORBENT POLYMER 150 g of ion exchange water is set to a 500 ml separable flask having an agitator, reflux condenser, dropping funnel, thermometer, and nitrogen gas introduction tube and 0.2 g of partially-saponified polyvinyl alcohol (GH-23 made by Nippon Synthetic Chemical Industry Co., Ltd.,) is added to the water as dispersant to heat and melt the dispersant before nitrogen replacement is executed.

Meanwhile, 22.5 g of laurylacrylate and tridecyl mixed ester (LTA made by Osaka Organic Chemical Industry Co., Ltd.), 10.0 g of hydroxyethyl methacrylate, and 17.5 g of methyl methacrylate are melted in an Erlenmeyer flask together with 1.0 g of azobisdimethylvaleronitrile and dropped into the above separable flask under nitrogen gas bubbling for one hour. Then the mixture is held for 5 hours at 65° C. to end the reaction, cooled to filter solid matter, and cleaned before it is dried or vacuumed to obtain bead-like dispersant.

360.7 g of n-hexane and 4.32 g of the above dispersant are set to a 100 ml separable flask having an agitator, reflux condenser, dropping funnel, thermometer, and nitrogen gas introduction tube, heated up to 50° C., and dispersed and melted before nitrogen replacement is executed.

Meanwhile, 72.0 g of acrylic acid is partially neutralized by 32.2 g of sodium hydroxide dissolved in 103.6 g of ion exchange water in an Erlenmeyer flask and 0.24 g of potassium persulfate is further dissolved in the solution at the room temperature. This monomer aqueous solution is dropped into the above separable flask under nitrogen gas bubbling for one hour at the agitating speed of 300 rpm. After refluxing for 2 hours, 0.1 g of 30% aqueous hydrogen peroxide is added to the solution and refluxing is further continued for one hour to complete polymerization. Then, 0.73 g of ethylene glycol diglycine ether is added to the solution and removing water by azeotropic distillation is executed to filter the solution before it is dried or vacuumed to obtain bead-like granular water absorbent polymer.

EMBODIMENT 1

The above bead-like water absorbent polymer (BL-100 made by Osaka Organic Chemical Industry Co., Ltd.) consists of grains with the average diameter of 100 μm and shows satisfactory flowability. The water absorption of the water absorbent polymer to city water at the room temperature is 71 times, the void index of the granular wet water absorbent polymer after absorbing water is 25 times, the non-tackiness of it is 103%, the drainage rate of it is 0.85, and the permeability of it is 5 min/cm.

EMBODIMENT 2

Artificial Snow Making Example 1

The aqueous slurry of granular wet water absorbent polymer is prepared by mixing and agitating 1 weight part of the bead-like water absorbent polymer in Embodiment 1 and 80 weight parts of water.

After flooding the aqueous slurry of the granular wet water absorbent polymer on the slope (inclination of approx. 10°) of the foundation of an artificial snow skiing field where a soft plastic cooling pipe with the inside diameter of approx. 5 mm capable of circulating coolant of −20° C. is set, the deposit layer of the granular wet water absorbent polymer with the thickness of approx. 5 cm is formed. When measuring the amount of filler water of the deposit layer approx. 3 hours after the layer is formed, it is found that approx. 3% of the filler water remains.

As the result of freezing the granular wet water absorbent polymer in approx. 12 hours after starting circulation of the coolant while contacting the polymer with a gas having a temperature of −2° C. approx. 3 hours after the granular wet water absorbent polymer is deposited, an ice slab with the thickness of approx. 2 cm and powdery artificial snow with the thickness of approx. 15 cm are obtained. The density of the powdery artificial snow is 0.23 g/cm$^3$. Photograph No.1 is a microscopic photograph showing a crystalline structure of the artificial snow, wherein the aggregate of crystal of ice having a length of approx. 0.5 mm, which is a mixture of ice grains including grains of the water absorbent polymer (having a length of approx. 0.09 mm) and ice grains not including grains of the water absorbent polymer. Photograph No. 2 is a microscopic photograph showing the condition wherein the crystalline structure of the artificial snow which is showed in photograph No. 1 is melted, wherein the water absorbent polymer absorbs water of the melting ice, and unabsorbed water exists between the grains of the wet water absorbent polymer. As the result of treading the artificial snow, a satisfactory sliding characteristic is obtained.

EMBODIMENT 3

Artificial Snow Making Example 2

The slurry of the granular wet water absorbent polymer used for Embodiment 2 is flown on the surface of the artificial snow slope used for Embodiment 2 to form a deposit layer with the thickness of approx. 5 cm.

In this case, freezing is started when part of filler water remains in the layer of approx. 2.5 cm from the bottom by restricting drainage of separated water.

Freezing is completed after approx. 5 hr and an ice slab with the thickness of approx. 3 cm and hard artificial snow with the thickness of approx. 5 cm are obtained.

The surface of the obtained artificial snow can easily be crushed and powdery artificial snow is obtained.

EMBODIMENT 4

Artificial Snow Making Example 3

Granular wet water absorbent polymer is frozen by the same method as in Embodiment 2 except the fact that a nonionic surface active agent (hydro-extracting agent (trade name: DRYWELL) made by Fuji Photo Film Co., Ltd.) is added to city water to be absorbed in granular water absorbent polymer. When the water absorbent polymer is not frozen up to approx. 2 cm from the surface, frozen artificial snow is mixed and agitated with unfrozen granular wet water absorbent polymer and then freezing is completed.

As a result, the drainage speed of separated water slightly increases and hard artificial snow with satisfactory sliding characteristic is obtained.

EMBODIMENT 5

Artificial Snow Making Example 4

As the result of adding the powder or solid carbon dioxide to the granular wet water absorbent polymer made by suction-filtering the slurry of the granular wet water absorbent polymer to eliminate most filler water and freezing the polymer, powdery artificial snow is obtained.

EMBODIMENT 5

Artificial Snow Making Example 5

Slurry is prepared by adding the amount of city water equal to the amount of the mixture of water and the granular wet water absorbent polymer obtained by melting the ice slab and artificial snow made by freezing the granular wet water absorbent polymer in Embodiment 2 to the mixture.

Then, the slurry is filtered to change it to the slurry containing approx. 80 times of water and frozen by the same method as in Embodiment 2. Resultingly, an ice slab and artificial snow same as those in Embodiment 2 are obtained.

EMBODIMENT 7

Artificial Snow Making Example 6

The slurry of granular wet water absorbent polymer is prepared by mixing and agitating 1 weight part of the bead-like water absorbent polymer in Embodiment 1 with 80 weight parts of 0.1% calcium chloride solution. In this case, the water absorption is 40 times.

Then, after flowing the slurry of the granular wet water absorbent polymer on the slope (inclination of approx. 20°) of the foundation of the artificial snow skiing field having a soft plastic cooling pipe with the inside diameter of approx. 5 mm capable of circulating coolant having a temperature of $-20°$ C., a deposit layer of the granular wet water absorbent polymer with the thickness of approx. 5 cm is formed.

As the result of freezing the deposit layer of the granular wet water absorbent polymer in approx. 12 hours after starting circulation of the coolant approx. 3 hours after the granular wet water absorbent polymer is deposited, an ice slab with the thickness of approx. 2 cm and powdery artificial snow with the thickness of approx. 10 cm are obtained.

ADVANTAGE OF THE INVENTION

The present invention provides a method to easily make an ice slab serving as the foundation of an artificial snow skiing field and artificial snow whose upper layer is powdery to hard by freezing the mixture of granular water absorbent polymer and a certain amount of water or flooding the mixture of fluid wet water absorbent polymer and water on a horizontal or slant floor before freezing it.

The method for making an ice slab and artificial snow of the present invention has the advantages that the aqueous mixture of granular wet water absorbent polymer and water can easily be transferred by a pump because the aqueous mixture is a fluid slurry and the rate between the frozen ice slab and upper artificial snow can be adjusted by controlling the amount of water present in the void between grains of the granular wet water absorbent polymer.

Moreover, the method of the present invention makes it possible to easily obtain the deposit of granular wet water absorbent polymer in which water is separated from the slurry of the polymer by flooding the aqueous slurry made by adding water to the granular wet water absorbent polymer on the slope of a natural skiing field, or slant and horizontal surfaces of a natural skiing field or indoor skiing field equipped with a cooling system. Therefore, it is possible to easily make an ice slab and artificial snow by freezing the deposit.

Also, the present invention has optically-degrading and/or bio-degrading characteristics and provides a colored and/or fragrant recoverable and reusable ice slab and artificial snow.

What is claimed is:

1. A method for making an ice slab, artificial snow or both, characterized by freezing granular, fully wet, water absorbent polymer wherein a void defined by a space between grains of the polymer is not completely filled with water.

2. A method for making an ice slab, artificial snow or both, characterized by separating water from an aqueous slurry of granular wet water absorbent polymer containing sufficient water or aqueous solution to fill all voids between grains of the granular wet water absorbent polymer and freezing the granular wet water absorbent polymer when voids between the grains of the polymer exist.

3. A method according to claim 1, wherein the granular wet water absorbent polymer comprises at least one of polymer or copolymer acrylamide, acrylic acid, salt of polyacrylic acid, vinyloxazolidine, salt of methacrylic acid, styrene, vinyl ether and styrene sulfonate.

4. A method according to claim 1, wherein the granular wet water absorbent polymer is spherical-shaped or crushed-shaped wet water absorbent polymer.

5. A method according to claim 1, wherein the granular wet water absorbent polymer has the characteristic of non-tackiness between the granular grains.

6. A method according to claim 1, wherein the granular wet water absorbent polymer has an average grain diameter of 0.005 to 5 mm.

7. A method according to claim 2, wherein water is separated from the aqueous slurry of the granular wet water absorbent polymer naturally or by means of suction.

8. A method according to claim 2, wherein water is separated from the aqueous slurry of the granular wet water absorbent polymer naturally or by means of suction by contacting the aqueous slurry of the granular wet water absorbent polymer with a permeable material.

9. A method according to claim 8, wherein the permeable material comprises at least one selected from the group consisting of textile, granular organic matter, porous metallic plate, and wire gauze.

10. A method according to claim 1, wherein the granular wet water absorbent polymer is frozen by contacting it with a solid having a temperature of the freezing point or below.

11. A method according to claim 10, wherein the solid having a temperature of the freezing point or below comprises at least one selected from the group consisting of plastic pipe, metallic pipe, plastic plate, metallic plate, ice, ice-containing material, and permeable material which are directly or indirectly cooled by a fluid having a temperature of the freezing point or below.

12. A method according to claim 10, wherein the solid maintaining a temperature of the freezing point or below is set in or under the granular wet water absorbent polymer.

13. A method according to claim 10, wherein the surface of the granular wet water absorbent polymer contacts a gas having a temperature of −5° C. or higher.

14. A method according to claim 1, wherein the granular wet water absorbent polymer surface is contacted with the gas having a temperature of −5° C. or higher is frozen by contacting it with the solid having a temperature of the freezing point, and, when at least part of the granular wet water absorbent polymer is frozen, the surface of the granular wet water absorbent polymer under the above condition or the condition in which unfrozen part of the polymer is mixed with the frozen part of it is frozen by contacting it with the gas having a temperature of the freezing point or below.

15. A method according to claim 1, wherein the surface of the granular wet water absorbent polymer is frozen by contacting it with the gas having a temperature of the freezing point or below.

16. A method according to claim 1, wherein the granular wet water absorbent polymer is frozen by contacting it with at least one of solid carbon dioxide, liquid carbon dioxide, and liquid nitrogen.

17. A method according to claim 1, wherein part or the whole of the frozen granular wet water absorbent polymer is crushed.

18. A method according to claim 17, wherein the crushed frozen granular wet water absorbent polymer is scattered on a substrate.

19. A method according to claim 1, wherein the granular wet water absorbent polymer is a wet water absorbent polymer which has been contacted with at least one agent selected from the group consisting of alkali metal salt or alkaline earth metal salt.

20. A method according to claim 1, wherein the granular wet water absorbent polymer is a wet water absorbent polymer which has been contacted with at least one surface active agent.

* * * * *